H. C. BRISTOL.
Wheel-Cultivator.
No. 63,698. Patented Apr. 9, 1867.
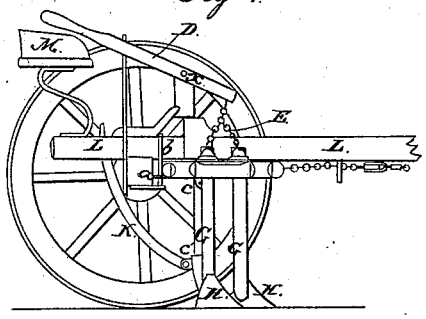
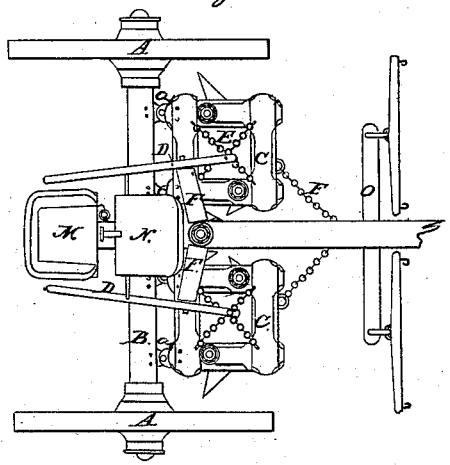
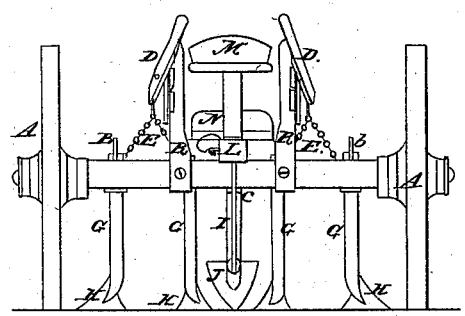

United States Patent Office.

H. C. BRISTOL, OF RAVENNA, OHIO.

Letters Patent No. 63,698, dated April 9, 1867.

---

IMPROVEMENT IN CULTIVATORS.

---

The Schedule referred to in these Letters Patent and making part of the same.

---

TO ALL WHOM IT MAY CONCERN:

Be it known that I, H. C. BRISTOL, of Ravenna, in the county of Portage, and State of Ohio, have invented certain new and useful improvements in Cultivators; and I do hereby declare that the following is a full and complete description of the same, reference being had to the accompanying drawings, making a part of this specification, in which—

Figure 1 is a side view of the cultivator.
Figure 2 is a top view.
Figure 3 is a rear end view.
Like letters refer to like parts in the different views.

A A, fig. 2, are a pair of wheels. B the axle; to this axle are attached the frames C, by means of the loops $a$ and standards $b$, fig. 1. Upon these standards the frames are made to slide upward and downward by the levers D, to which they are connected by the chains E. These levers are pivoted to the stays F at the point $x$, and are operated by a driver, as and for the purpose hereafter described. To these frames are secured the standards G, to the lower end of which are bolted the blades or shares H. I is also a standard, to the lower end of which is fixed the shovel J, fig. 3. This standard is provided with a joint, $c$, fig. 1, by means of which it may be turned up under the axle, and retained in that position by the guide-stay K, which is pivoted to the shovel, as shown at $c'$, fig. 1, and extends up through the tongue L, and secured to the same by the insertion of a pin. M is a seat; N, a foot-board, and O the double-tree, to which the team is geared.

The manner of operating this machine is as follows: The driver takes his place upon the seat alluded to, the shovel and shares are then allowed to fall upon the ground, their proper direction having been previously adjusted. The team is then started, and the machine is drawn forward by the chains P, connected to the frames, and the work of cultivating then proceeds. It will be seen that the draught is applied to the frames, and not to the pole or tongue of the machine; and being thus applied, the shares are kept strongly and persistently in the ground, but not so rigidly as to refuse to yield to any obstruction or unevenness of the ground, but will, when such obstruction is presented, rise up by the flexion of the chain, and at the same time will be retained from being displaced by the standards $b$, to which they are attached, as above said. Thus the construction and action of the machine combine that of the ordinary rigid cultivator and adjustable or common harrow. In the ordinary wheeled cultivator the shares are rigidly secured to the frame, in consequence of which they are very liable to become displaced or broken, for the reason that they cannot yield readily, or at all, to the roughness of the ground or to obstructions. But in this cultivator the liability to break is obviated by the gangs of shares being hung in the manner as described, and thus being adjustable will pass over or turn aside from any great obstruction that may offer. The shares H are seen to be straight across the edge. By being thus shaped they smooth down rather than turn up the ground to any considerable depth, and hence are better adapted to the harrowing of furrowed ground than if they were shield shape or pointed, as the central share or shovel J. The shank or standard of this shovel, as above observed, is jointed; thereby it can be turned up under the machine when not needed in the gang of shares, or the depth that it is required to enter the ground can be regulated by the guide-stay K. Should it be required to throw the loosened dirt toward the centre of the machine, or toward the sides, the direction of the shares can be changed for that purpose by turning their standards, which is easily done by slackening the nuts by which they are secured to the frames. By means of the lever D the frames can be raised up, and thereby regulate the depth of cultivating; also, they may be so raised as to draw the shares entirely from the ground, and there retained by slipping the arm of the lever into a notch in the side of the standard R, fig. 3. Thus the machine can be run from place to place without danger to the shares.

What I claim as my improvement, and desire to secure by Letters Patent, is—

1. The movable frames C, provided with the adjustable standards G, and shares H, as arranged and connected in combination with the levers D, draught chains P, and carriage, for the purpose and in the manner set forth.

2. The jointed standard I, provided with the shovel J, and guide-stay K, in combination with the standards G, shares H, and carriage, as and for the purpose described.

H. C. BRISTOL.

Witnesses:
W. H. BURRIDGE,
E. E. WAITE.